US011251973B1

(12) United States Patent
Adikari

(10) Patent No.: US 11,251,973 B1
(45) Date of Patent: Feb. 15, 2022

(54) EFFICIENT CALCULATION OF ED25519/448 SIGNATURE VERIFICATION IN AN ENCRYPTION DEVICE

(71) Applicant: Synopsys, Inc., Mountain View, CA (US)

(72) Inventor: Jithra Adikari, Ottawa (CA)

(73) Assignee: Synopsys, Inc., Mountain View, CA (US)

( * ) Notice: Subject to any disclaimer, the term of this patent is extended or adjusted under 35 U.S.C. 154(b) by 127 days.

(21) Appl. No.: 16/436,652

(22) Filed: Jun. 10, 2019

Related U.S. Application Data

(60) Provisional application No. 62/683,370, filed on Jun. 11, 2018.

(51) Int. Cl.
| | |
|---|---|
| *H04L 9/32* | (2006.01) |
| *G06F 7/72* | (2006.01) |
| *H04L 9/30* | (2006.01) |

(52) U.S. Cl.
CPC ............ *H04L 9/3252* (2013.01); *G06F 7/725* (2013.01); *H04L 9/3066* (2013.01)

(58) Field of Classification Search
CPC ..... H04L 9/00; H04L 9/30; H04L 9/32; H04L 9/08; H04L 9/3252; H04L 9/3066; G06F 7/72; G06F 15/00; G06F 7/60; G06F 7/725
See application file for complete search history.

(56) References Cited

U.S. PATENT DOCUMENTS

| | | | | |
|---|---|---|---|---|
| 7,991,154 | B2 * | 8/2011 | Longa ..................... | G06F 7/725 380/30 |
| 8,009,829 | B2 * | 8/2011 | Jueneman ............. | H04L 9/3066 380/28 |
| 9,584,320 | B1 * | 2/2017 | Parkinson ............. | H04L 9/0841 |
| 9,772,821 | B2 * | 9/2017 | Feix ....................... | H04L 9/3236 |

(Continued)

OTHER PUBLICATIONS

Jithra Adikari and Vassil S. Dimitrov (Canada) and Renato J. Cintra (Brazil), A New Algorithm for Double Scalar Multiplication over Koblitz Curves, 978-1-4244-9474-3/11/$26.00 © 2011, IEEE, pp. 709-712. (Year: 2011).*

*Primary Examiner* — Thanhnga B Truong
(74) *Attorney, Agent, or Firm* — Weaver Austin Villeneuve & Sampson LLP

(57) ABSTRACT

A computer system module(s) substitutes a double scalar multiplication, used for signature verification in an encryption/decryption system, for two single scalar multiplications. The modules verify a group equation defined by [S]B=R+[k]A' of the encryption/decryption system, where S is an integer characterized by the signature, K is an integer generated by a message being encrypted, B is a base point on the elliptic curve, R is a point on the elliptic curve and characterized by the signature, and A' is a public key. The modules optionally rearrange the group equation to [S]B+[−k]A'=R, and convert it to [S]B+[n−k]A'=R, where n is the order of the base point. The modules determine a joint sparse form for the integers S and n−k and apply the Shamir's algorithm to the joint sparse form to verify the group equation.

20 Claims, 4 Drawing Sheets

(56) References Cited

U.S. PATENT DOCUMENTS

2001/0048741 A1* 12/2001 Okeya ..................... G06F 7/725
                                                    380/28
2005/0071414 A1*  3/2005 Taunton ................ G06F 7/4812
                                                    708/622

* cited by examiner

EFFICIENT CALCULATION OF ED25519/448 SIGNATURE VERIFICATION IN AN ENCRYPTION DEVICE

CROSS REFERENCE TO RELATED APPLICATIONS

The present application claims benefit under 35 USC 119(e) of U.S. Application Ser. No. 62/683,370 filed Jun. 11, 2018, the content of which is incorporated herein by reference in its entirety.

COPYRIGHT NOTICE

This patent document can be exactly reproduced as it appears in the files of the United States Patent and Trademark Office, but the assignee(s) otherwise reserves all rights in any included original works of authorship in this document protected by copyright law.

SPECIFICATION—DISCLAIMERS

In the following Background, Summary, and Detailed Description, paragraph headings do not signify limitations. In these writings, the citation or identification of any publication signifies neither relevance nor status as prior art. Paragraphs for which the text is all italicized signifies text that is common to multiple patent specifications filed by the assignee(s).

A writing enclosed in double quotes (" ") signifies an exact copy of a writing that has been expressed as a work of authorship. Signifiers such as a word or a phrase enclosed in single quotes (' ') signifies a term to be defined that it is not to be evaluated for, or has no, meaning in that specific use (for example, when the term 'module' is first defined).

FIELD(S) OF TECHNOLOGY

The following information is solely for use in searching the prior art. This disclosure has significance in the field of electronics in general, including the following topics:

BACKGROUND

In the field of elliptic curve cryptography, Edward curves are becoming popular. Most widely used Edward curves are Ed25519 and Ed448. These curves are used for signing and signature verification. In signature verification algorithm, a significant amount of time is consumed by two single scalar multiplications. A single scalar multiplication may be defined as [k]P, where, k is an integer and P is a point on a given elliptic curve. A list of protocols and software that uses the Ed25519 public-key signature system may be found at https://ianix.com/pub/ed25519-deplownent.html.

Techniques for implementation of a key exchange protocol and digital signature scheme based on the Curve25519 elliptic curve and its Edwards form on resource constrained ARM processor cores has been shown. See, for example: http://www.cs.haifa.ac.il/~orrd/LC17/paper39.pdf The following are some initial benchmarks of an Ed25519 implementation available from https://www.wolfssl.com/ed25519-support-coming-to-wolfcrypt/on May 31, 2018:
CPU: 2.5 GHz Intel Core i7

ECC 256 key generation 0.775 milliseconds, average over 100 iterations

EC-DSA sign time 0.739 milliseconds, average over 100 iterations

EC-DSA verify time 0.528 milliseconds, average over 100 iterations

ED25519 key generation 0.055 milliseconds, average over 100 iterations

ED25519 sign time 0.053 milliseconds, average over 100 iterations

ED25519 verify time 0.184 milliseconds, average over 100 iterations Raspberry Pi (ARM 700 MHz)

ECC 256 key generation 82.494 milliseconds, average over 100 iterations

EC-DSA sign time 84.862 milliseconds, average over 100 iterations

EC-DSA verify time 52.444 milliseconds, average over 100 iterations

ED25519 key generation 1.543 milliseconds, average over 100 iterations

ED25519 sign time 1.821 milliseconds, average over 100 iterations

ED25519 verify time 3.832 milliseconds, average over 100 iterations

SUMMARY

This Summary is a prelude to the Detailed Description. This Summary, together with the independent Claims, signifies a brief writing about at least one claimed invention (which can be a discovery, see 35 USC 100(a); and see 35 USC 100(j)), for use in commerce that is enabled by the Specification and Drawings.

A computer system, in accordance with one embodiment of the present invention, includes modules configured to substitute a double scalar multiplication for two single scalar multiplications. The modules may be hardware modules, software modules or a combination of hardware and software modules.

In one embodiment, the double scalar multiplication is used for signature verification in an encryption/decryption system. The double scalar multiplication is defined by a first integer applied to a first point on an elliptic curve and a second integer applied to a second point on the elliptic curve. In one embodiment, the modules verify a group equation defined by [S]B=R+[k]A' of the encryption/decryption system, where S is an integer characterized by the signature, K is an integer generated by a message being encrypted, B is a base point on the elliptic curve, R is a point on the elliptic curve and characterized by the signature, and A' is a public key.

In one embodiment, the modules rearrange the group equation either to [S]B−[k]A'=R, or to [S]B+[−k]A'=R. In one embodiment, the modules convert the −k in the group equation [S]B+[−k]A'=R to [S]B+[n−k]A'=R, where n is the order of the base point. In one embodiment, the modules determine points B+A' and B−A'. In one embodiment, the modules determine a joint sparse form for the integers S and n−k.

In one embodiment, the modules apply the Shamir's algorithm to the joint sparse form to verify the group equation [S]B+[n−k]A'=R. In one embodiment, the modules convert the group equation [S]B+[−k]A'=R to [S]B+[k](−A')=R. In one embodiment, the modules determine a joint sparse form for the integers S and k. In one embodiment, the modules apply the Shamir's algorithm to the joint sparse form to verify the group equation [S]B+[−k]A'=R. In one embodiment, the computer system is a distributed computer system.

A computer implemented method, in accordance with one embodiment of the present invention, substitutes a double scalar multiplication for two single scalar multiplications. In one embodiment, the double scalar multiplication is used for signature verification in an encryption/decryption system. The double scalar multiplication is defined by a first integer applied to a first point on an elliptic curve and a second integer applied to a second point on the elliptic curve.

In one embodiment, the method further includes, in part verifying a group equation defined by [S]B=R+[k]A' of the encryption/decryption system, where S is an integer characterized by the signature, K is an integer generated by a message being encrypted, B is a base point on the elliptic curve, R is a point on the elliptic curve and characterized by the signature, and A' is a public key.

In one embodiment, the method further includes, in part, rearranging the group equation to one of [S]B−[k]A'=R or to [S]B+[−k]A'=R. In one embodiment, the method further includes, in part, converting the −k in the group equation [S]B+[−k]A'=R to [S]B+[n−k]A'=R, where n is the order of the base point.

In one embodiment, the method further includes, in part, determining points B+A' and B−A'. In one embodiment, the method further includes, in part, determining a joint sparse form for the integers S and n−k. In one embodiment, the method further includes, in part, applying the Shamir's algorithm to the joint sparse form to verify the group equation [S]B+[n−k]A'=R.

In one embodiment, the method further includes, in part, converting the group equation [S]B+[−k]A'=R to [S]B+[k](−A')=R. In one embodiment, the method further includes, in part, determining a joint sparse form for the integers S and k. In one embodiment, the method further includes, in part, applying the Shamir's algorithm to the joint sparse form to verify the group equation [S]B+[−k]A'=R. In one embodiment, the computer system is a distributed computer system.

DRAWINGS

The following Detailed Description, Figures, and Claims signify the uses and advantages of the claimed inventions, and their embodiments. All of the Figures are used only to provide knowledge and understanding and do not limit the scope of the claimed inventions and their embodiments. Such Figures are not necessarily drawn to scale.

Similar components or features used in the Figures can have the same, or similar, reference signs in the form of labels (such as alphanumeric symbols, e.g., reference numerals), and can signify a similar or equivalent use. Further, various components of the same type can be distinguished by following the reference label by a dash and a second label that distinguishes among the similar components. If only the first reference label is used in the Specification, its use applies to any similar component having the same first reference label irrespective of the second reference label. A brief description of the Figures is below.

Figure 1:
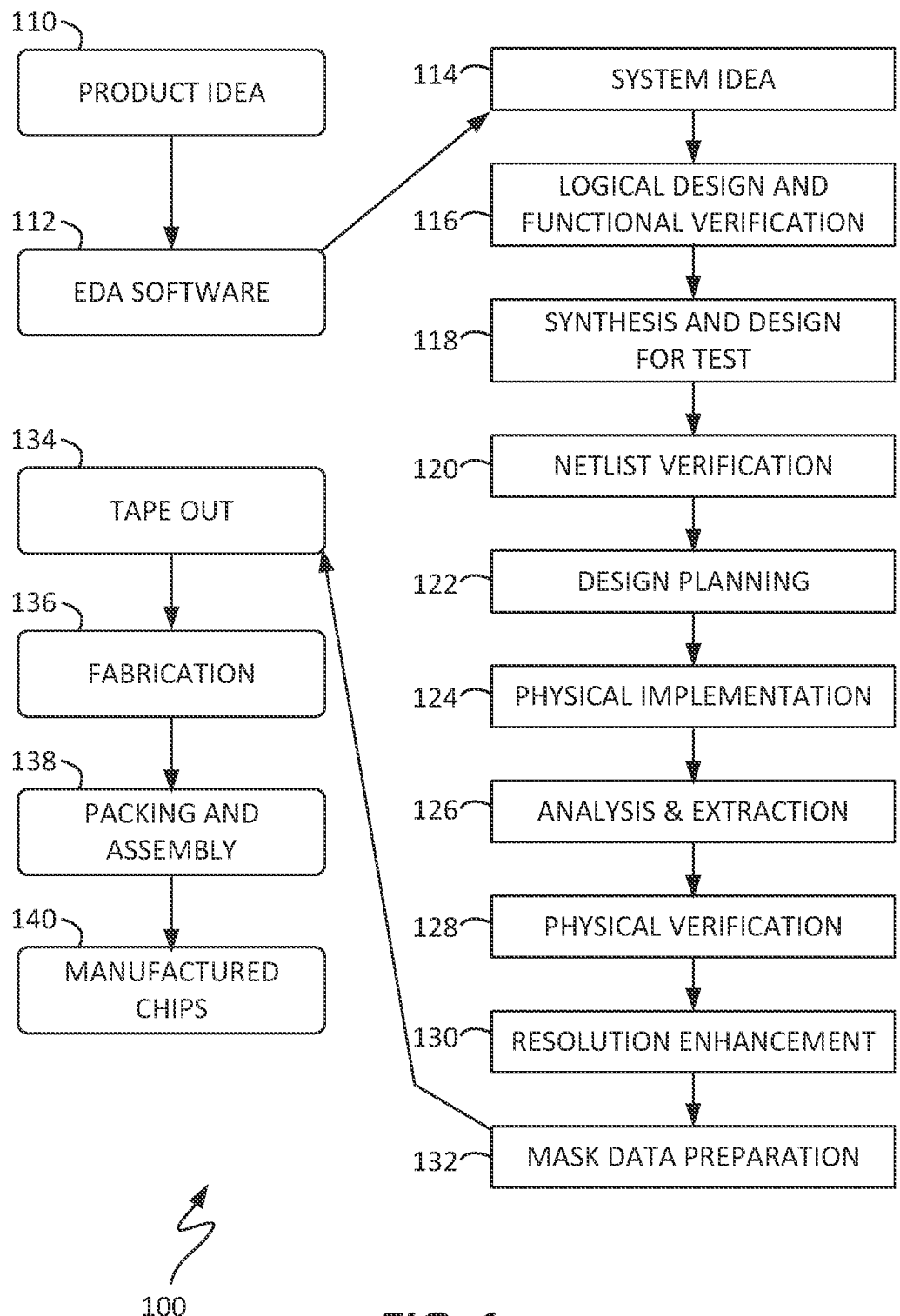
FIG. 1 depicts a flowchart of various processes used during the design and manufacture of an integrated circuit.

In the Figures, reference signs can be omitted as is consistent with accepted engineering practice; however, a skilled person will understand that the illustrated components when viewed in the context of the Figures as a whole, of the accompanying writings about such Figures, and of the embodiments of the claimed inventions.

DETAILED DESCRIPTION

The Figures and Detailed Description signify, only to provide knowledge and understanding, the claimed inventions. To minimize the length of the Detailed Description, while various features, structures or characteristics can be described together in a single embodiment, they also can be used in other embodiments without being written about. Variations of any of these elements, and modules, processes, machines, systems, manufactures or compositions disclosed by such embodiments and/or examples are easily used in commerce. The Figures and Detailed Description also can signify, implicitly or explicitly, advantages and improvements of the claimed inventions and their embodiments for use in commerce.

In the Figures and Detailed Description, numerous specific details can be described to enable at least one embodiment of the claimed inventions. Any embodiment disclosed herein signifies a tangible form of a claim invention. To not obscure the significance of the embodiments and/or examples in this Detailed Description, some elements that are known to a skilled person can be combined together for presentation and for illustration purposes and not be described in detail. To not obscure the significance of these embodiments and/or examples, some well-known processes, machines, systems, manufactures or compositions are not written about in detail. However, a skilled person can use these embodiments and/or examples in commerce without these specific details or their equivalents. Thus, the Detailed Description focuses on enabling the distinctive elements of the claimed inventions and exemplary embodiments. Where this Detailed Description refers to some elements in the singular tense, more than one element can be depicted in the Figures and like elements are labeled with like numerals.

Embodiments of the present invention significantly increase the speed of signature verification in elliptic curve cryptography. The following description of the embodiments of the present invention are provided with reference to Edward curves Ed25519 and Ed448. It is understood, however, that the embodiments of the present invention are not so limited and apply to any form of cryptography using one or more double scalar multiplications. A method and an apparatus, in accordance with one embodiment of the present invention, substitute a double scalar multiplication for two single scalar multiplications to increase the speed of signature verification, as described further below. In some embodiments, a performance improvement of about 50% is achieved. A double scalar multiplication may be defined as [k]P+[l]Q, where k, l are integers and P, Q are points on an elliptic curve used for encryption and decryption.

In one embodiment, the Edwards-curve Digital Signature Algorithm (EdDSA), which is a variant of Schnorr's signature system with possibly twisted Edwards curves is utilized. The EdDSA provides a number of advantages. For example, the EdDSA provides high performance on a variety of platforms. The EdDSA does not require the use of a unique random number for each signature. The EdDSA is more resilient to side-channel attacks. The EdDSA uses relatively small public keys (32 or 57 bytes) and signatures (64 or 114 bytes) for Ed25519 and Ed448, respectively. The formulas used in the EdDSA are complete and are valid for all the points on the curve, thus obviating the need to perform expensive point validation on untrusted public values. The EdDSA provides collision resilience, therefore, hash-function collisions do not break this system (only holds for PureEdDSA). As is known, the Ed25519 is intended for operation at around the 128-bit security level and the Ed448 is intended for operation at around the 224-bit security level.

Sections 5.1.7 and 5.2.7 of RFC 8032, which is described at https://www.rfc-editor.org/info/rfc8032, specify the signature verification algorithms for Edward curves Ed25519 and Ed448. According to step three of the signature verification algorithm, the algorithm has to check the group equation:

$$[S]B=R+[k]A' \qquad (1)$$

where S is an integer and part of the signature, k is an integer generated based on message, B is the base point, R is a point on a given elliptic curve and part of the signature, and A' is the public key.

The above equation (1) may be written as either one of equations (2) or (3) below:

$$[S]B-[k]A'=R \qquad (2)$$

$$[S]B+[-k]A'=R \qquad (3)$$

By writing −k in a modular arithmetic form as n−k, where n is the order of the base point, equation (3) may be written as:

$$[S]B+[n-k]A'=R \qquad (4)$$

By determining the joint sparse form for the two integers S and n−k, and applying the Shamir's method to the joint sparse form, equation (4) is computed. To apply the Shamir's method to the joint sparse form, two points, namely B+A' and B−A' should be precomputed.

Equation (2) above may be written as:

$$[S]B+[k](-A')=R \qquad (5)$$

Assume A'=(xA, yA), then:

$$-A'=(-xA,yA)$$

$-xA=p-xA$, where $p$ is the order of finite field.

Next, points B+A' and B−A' are precomputed. Then the joint sparse form for the two integers S and k is applied to the equation (5) above.

Alternatively, with respect to Ed25519 curve, the following group equation may be checked:

$$[8][S]B=[8]R+[8][k]A' \qquad (6)$$

Equation (6) may be rearranged as:

$$[8][S]B-[8][k]A'=[8]R \qquad (7)$$

If n is the order of the base point, equation (7) may be rearranged as:

$$[8][S]B+[8][n-k]A'=[8]R \qquad (8)$$

Next, the joint sparse form for 8S and 8(n−k) is determined and applied to points B and A'.

Equation (7) may alternatively be rearranged as:

$$[8][S]B+[8][k](-A')=[8]R \qquad (9)$$

Next, the joint sparse form for 8S and 8 k is determined and applied to the points B and −A'. Negation of the point A' is calculated as described above.

Assuming n is the order of the base point, and S' and k' are defined as shown below:

$$S'=8S \bmod n;$$

$$k'=8k \bmod n$$

Then equation (9) may be written as:

$$[S']B=[8]R+[k']A' \qquad (10)$$

Rearranging equation (9) provides:

$$[S']B-[k']A'=[8]R \qquad (11)$$

Equation (11) may be written as either of the following equations:

$$[S']B+[n-k']A'=[8]R$$

$$[S']B+[k'](-A')=[8]R$$

Then the joint sparse form is applied to the scalars to compute the result point to check the group equation. Alternatively, with respect to the Ed448 curve, the following group equation may be checked:

$$[4][S]B=[4]R+[4][k]A' \qquad (12)$$

Equation (12) may be rearranged as:

$$[4][S]B-[4][k]A'=[4]R \qquad (13)$$

Assuming n is the order of the base point, equation (13) may be rearranged as:

$$[4][S]B+[4][n-k]A'=[4]R \qquad (14)$$

Next, the joint sparse form for 4S and 4(n−k) is computed and applied to the points B and A'. Alternatively, equation (13) may be rearranged as:

$$[4][S]B+[4][k](-A')=[4]R \qquad (15)$$

Next, the joint sparse form for 4S and 4 k is computed and applied to the points B and A'. Negation of the point A' may be calculated as described above.

Assume:

$$S'=4S \bmod n; \text{ and}$$

$$k'=4k \bmod n$$

where n is the order of the base point. Accordingly, equation (15) may be written as:

$$[S']B=[4]R+[k']A' \qquad (16)$$

Rearranging equation (16) provides:

$$[S']B-[k']A'=[4]R \qquad (17)$$

Equation (17) may be expressed in either one of the following equations (18) or (19):

$$[S']B+[n-k']A'=[4]R \qquad (18)$$

$$[S']B+[k'](-A')=[4]R \qquad (19)$$

The joint sparse form may then be applied to the scalars to compute the resultant point to check the group equation. In accordance with one aspect, embodiments of the present invention therefore rearrange the equations:

$$[S]B=R+[k]A'$$

$$[8][S]B=[8]R+[8][k]A'$$

$$[4][S]B=[4]R+[4][k]A'$$

of RFC 8032 to apply joint sparse form to efficiently compute double scalar multiplication over elliptic curves Ed 25519 and Ed 448.

Modules that implement embodiments of the technology disclosed herein may be executed on computer system as shown in FIGS. 1, 2A, 2B, 2C and 3. Such computer systems are suitable for use with embodiments of the technology, as well as circuit design and circuit embodiments of the technology.

DETAILED DESCRIPTION—TECHNOLOGY SUPPORT FROM DATA/INSTRUCTIONS TO PROCESSORS/PROGRAMS

Data and Information. While 'data' and 'information' often are used interchangeably (e.g., 'data processing' and 'information processing'), the term 'datum' (plural 'data') typically signifies a representation of the value of a measurement of a physical quantity (e.g., the current in a wire), or the answer to a question (e.g., "yes" or "no"), while the term 'information' typically signifies a structured set of data (often times signified by 'data structure'). A specified data structure is used to structure an electronic device to be used as a specific machine as an article of manufacture (see In re Lowry, 32 F.3d 1579 [CAFC, 1994]). Data and information are physical, for example binary data (a 'bit', usually signified with '0' and '1') enabled with two different levels of voltage in a circuit. For example, data can be enabled as an electrical, magnetic, optical or acoustical signal; a quantum state such as spin that enables a 'qubit'; or a physical state of an atom or molecule. All such data and information, when enabled, are stored, accessed, transferred, combined, compared, or otherwise acted upon, actions that require energy.

As used herein, the term 'process' signifies an unnatural sequence of physical actions and/or transformations (both also referred to as 'operations' or 'steps') to produce at least one result. The actions and transformations are technical applications of one or more natural laws of science or unnatural laws of technology. The actions and transformations often change the physical state of a machine, of structures of data and information, or of a composition of matter. Two or more actions can occur at about the same time, or one action can occur before or after another action, if they produce the same result. A description of the physical actions and/or transformations that comprise a process are often signified with a set of gerund phrases (or their semantic equivalents) that are typically preceded with the signifier 'the steps of' (e.g., "a process comprising the steps of measuring, transforming, partitioning and then distributing . . . "). The signifiers 'algorithm', 'method', 'procedure', '(sub) routine', 'protocol', 'recipe', and 'technique' often are used interchangeably with 'process', and 35 U.S.C. 100 defines a "method" as one type of process that is, by statutory law, always patentable under 35 U.S.C. 101. Many forms of knowledge, learning, skills and styles are authored, structured, and enabled—objectively—as processes—e.g., knowledge and learning as functions in knowledge programming languages. As used herein, the term 'rule' signifies a process with at least one conditional test (signified, e.g., by 'IF test THEN process'). As used herein, the term 'thread' signifies a sequence of operations or instructions that comprise a subset of an entire process. A process can be partitioned into multiple threads that can be used at or about at the same time.

As used herein, the term 'component' (also signified by 'part', and typically signified by 'element' when described in a patent text or diagram) signifies a physical object that is used to enable a process in combination with other components. For example, electronic components are used in processes that affect the physical state of one or more ('ensemble') electromagnetic or quantum particles/waves (e.g., electrons, photons) or quasiparticles (e.g., electron holes, phonons, magnetic domains) and their associated fields or signals. Electronic components have at least two connection points to which are attached 'leads', typically a wire with one end attached to the component and the other end attached to another component, typically as part of a circuit with current flows. There are at least three types of electrical components: passive, active and electromechanical. Passive electronic components typically do not introduce energy into a circuit—such components include resistors, memristors, capacitors, magnetic inductors, crystals, Josephson junctions, transducers, sensors, antennas, waveguides, etc. Active electronic components require a source of energy and can inject energy into a circuit—such components include semiconductors (e.g., diodes, transistors, optoelectronic devices), vacuum tubes, batteries, power supplies, displays (e.g., LEDs, LCDs, lamps, CRTs, plasma displays). Electromechanical components affect current flow using mechanical forces and structures—such components include switches, relays, protection devices (e.g., fuses, circuit breakers), heat sinks, fans, cables, wires, terminals, connectors and printed circuit boards. As used herein, the term 'netlist' is a specification of the components comprising an electric circuit, and electrical connections between the components. The programming language for the SPICE circuit simulation program is often used to specify a netlist. In the context of circuit design, the term 'instance' signifies each time a component is specified in a netlist.

One of the most important components as goods in commerce is the integrated circuit, and its res of abstractions. As used herein, the term 'integrated circuit' signifies a set of connected electronic components on a small substrate (thus the use of the signifier 'chip') of semiconductor material, such as silicon or gallium arsenide, with components fabricated on one or more layers. Other signifiers for 'integrated circuit' include 'monolithic integrated circuit', 'IC', 'chip', 'microchip' and 'System on Chip' ('SoC'). Types of integrated circuits include gate/logic arrays, processors, memories, interface chips, power controllers, and operational amplifiers. The term 'cell' as used in electronic circuit design signifies a specification of one or more components, for example, a set of transistors that are connected to function as a logic gate. Cells are usually stored in a database, to be accessed by circuit designers and design processes.

As used herein, the term 'module' signifies a tangible structure for acting on data and information that typically is limited in size and/or complexity. For example, the term 'module' can signify one or more processes that transforms data and information, for example, processes comprising a computer program. The term 'module' also can signify one or more interconnected electronic components, such as digital logic devices. A process comprising a module, if specified in a programming language, such as System C or Verilog, also can be transformed into a specification for a structure of electronic components that transform data and information that produce the same result as the process. This last sentence follows from a modified Church-Turing thesis, which is simply expressed as "Whatever can be transformed by a (patentable) process and a processor, can be transformed by a (patentable) equivalent set of modules.", as opposed to the doublethink of deleting only one of the "(patentable)".

A module is permanently structured (e.g., circuits with unalterable connections), temporarily structured (e.g., circuits or processes that are alterable with sets of data), or a combination of the two forms of structuring. Permanently structured modules can be manufactured, for example, using Application Specific Integrated Circuits ('ASICs') such as Arithmetic Logic Units ('ALUs'), Programmable Logic Arrays ('PLAs'), or Read Only Memories ('ROMs'), all of which are typically structured during manufacturing. For example, a permanently structured module can comprise an integrated circuit. Temporarily structured modules can be manufactured, for example, using Field Programmable Gate Arrays (FPGAs—for example, sold by Xilink or Intel's Altera), Random Access Memories (RAMs) or microprocessors. For example, data and information is transformed using data as an address in RAM or ROM memory that stores output data and information. One can embed temporarily structured modules in permanently structured modules (for example, a FPGA embedded into an ASIC).

Modules that are temporarily structured can be structured during multiple time periods. For example, a processor comprising one or more modules has its modules first structured by a manufacturer at a factory and then further structured by a user when used in commerce. The processor can comprise a set of one or more modules during a first time period, and then comprise a different set of one or modules during a second time period. The decision to manufacture or implement a module in a permanently structured form, in a temporarily structured form, or in a combination of the two forms, depends on issues of commerce such as cost, time considerations, resource constraints, tariffs, maintenance needs, national intellectual property laws, and/or specific design goals. How a module is used is mostly independent of the physical form in which it is manufactured or enabled. This last sentence also follows from the modified Church-Turing thesis.

As used herein, the term 'processor' signifies a tangible data and information processing machine for use in commerce that physically transforms, transfers, and/or transmits data and information, using at least one process. A processor consists of one or more modules (e.g., a central processing unit, 'CPU'; an input/output ('I/O') controller, a memory controller, a network controller, and other modules). The term 'processor' can signify one or more processors, or one or more processors with multiple computational cores/CPUs, specialized processors (for example, graphics processors or signal processors), and their combinations. Where two or more processors interact, one or more of the processors can be remotely located. Where the term 'processor' is used in another context, such as a 'chemical processor', it will be signified and defined in that context.

The processor can comprise, for example, digital logic circuitry (for example, a binary logic gate), and/or analog circuitry (for example, an operational amplifier). The processor also can use optical signal processing, DNA transformations or quantum operations, microfluidic logic processing, or a combination of technologies, such as an optoelectronic processor. For data and information structured with binary data, any processor that can transform data and information using the AND, OR and NOT logical operations (and their derivatives, such as the NAND, NOR, and XOR operations) also can transform data and information using any function of Boolean logic. A processor such as an analog processor, such as an artificial neural network, also can transform data and information. No scientific evidence exists that any of these technological processors are processing, storing and retrieving data and information, using any process or structure equivalent to the bioelectric structures and processes of the human brain.

The one or more processors also can use a process in a 'cloud computing' environment, where time and resources of multiple remote computers are shared by multiple users or processors communicating with the computers. For example, a group of processors can use at least one process available at a distributed or remote system, these processors using a communications network (e.g., the Internet, or an Ethernet) and using one or more specified interfaces (e.g., an application program interface ('API') that signifies functions and data structures to communicate with the remote process).

As used herein, the term 'computer' and 'computer system' (further defined below) includes at least one processor that, for example, performs operations on data and information such as (but not limited to) the AND, OR and NOT logical operations using electronic gates that can comprise transistors, with the addition of memory (for example, memory structured with flip-flops using the NOT-AND or NOT-OR operation). Such a processor is Turing-complete and computationally universal. A computer can comprise a simple structure, for example, comprising an I/O module, a CPU, and a memory that performs, for example, the process of inputting a signal, transforming the signal, and outputting the signal with no human intervention.

As used herein, the term 'programming language' signifies a structured grammar for specifying sets of operations and data for use by modules, processors and computers. Programming languages include assembler instructions, instruction-set-architecture instructions, machine instructions, machine dependent instructions, microcode, firmware instructions, state-setting data, or either source code or object code written in any combination of one or more higher level languages, for example, the C programming language and similar general programming languages (such as Fortran, Basic, Javascript, PHP, Python, C++), knowledge programming languages (such as Lisp, Smalltalk Prolog, or CycL), electronic structure programming languages (such as VHDL, Verilog, SPICE or SystemC), text programming languages (such as SGML, HTML, or XML), or audiovisual programming languages (such as SVG, MathML, X3D/VRML, or MIDI), and any future equivalent programming languages. As used herein, the term 'source code' signifies a set of instructions and data specified in text form using a programming language. A large amount of source code for use in enabling any of the claimed inventions is available on the Internet, such as from a source code library such as Github.

As used herein, the term 'program' (also referred to as an 'application program') signifies one or more processes and data structures that structure a module, processor or computer to be used as a "specific machine" (see In re Alappat, 33 F3d 1526 [CAFC, 1991]). One use of a program is to structure one or more computers, for example, standalone, client or server computers, or one or more modules, or systems of one or more such computers or modules. As used herein, the term 'computer application' signifies a program that enables a specific use, for example, to enable text processing operations, or to encrypt a set of data. As used herein, the term 'firmware' signifies a type of program that typically structures a processor or a computer, where the firmware is smaller in size than a typical application program, and is typically not very accessible to or modifiable by the user of a computer. Computer programs and firmware are often specified using source code written in a programming language, such as C. Modules, circuits, processors, programs, and computers can be specified at multiple levels of abstraction, for example, using the SystemC programming language, and have value as products in commerce as taxable goods under the Uniform Commercial Code (see U.C.C. Article 2, Part 1).

A program is transferred into one or more memories of the computer or computer system from a data and information device or storage system. A computer system typically has a device for reading storage media that is used to transfer the program, and/or has an interface device that receives the program over a network. This process is discussed in the General Computer Explanation section.

DETAILED DESCRIPTION—TECHNOLOGY SUPPORT GENERAL COMPUTER EXPLANATION

FIGS. 31A, 31B and 31C are abstract diagrams of a computer system suitable for enabling embodiments of the claimed inventions.

Figure 2A:
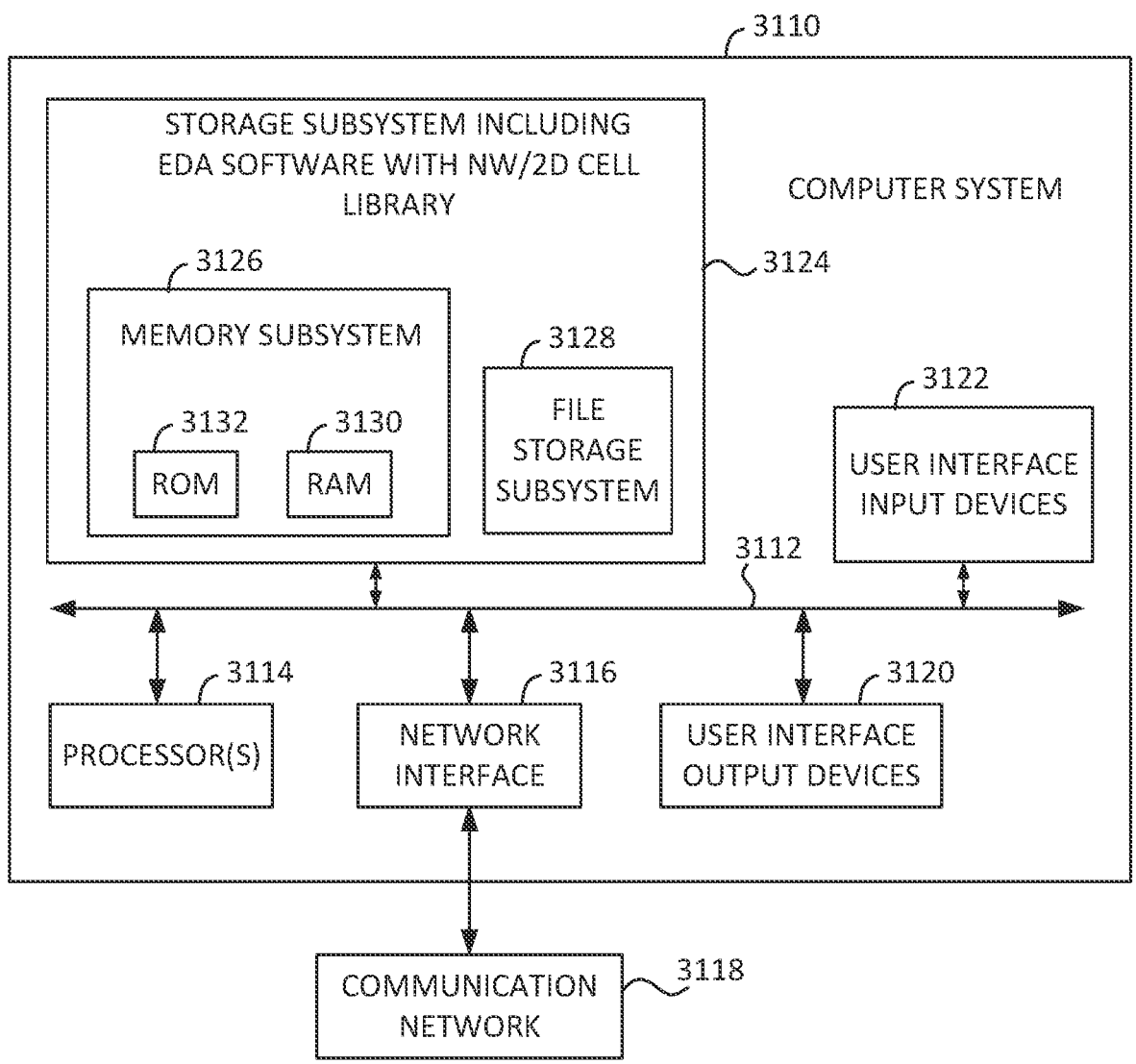
FIGS. 2A, 2B and 2C depict abstract diagrams of a computer system for use in commerce, if needed, by embodiments of the claimed inventions, as well as an embodiment of a circuit design and an embodiment of a manufactured circuit used in these claimed inventions.

In FIG. 2A, the structure of computer system 3110 typically includes at least one computer 3114 which communicates with peripheral devices via bus subsystem 3112. Typically, the computer includes a processor (e.g., a microprocessor, graphics processing unit, or digital signal processor), or its electronic processing equivalents, such as an Application Specific Integrated Circuit ('ASIC') or Field Programmable Gate Array ('FPGA'). Typically, peripheral devices include a storage subsystem 3124, comprising a memory subsystem 3126 and a file storage subsystem 3128, user interface input devices 3122, user interface output devices 3120, and/or a network interface subsystem 3116. The input and output devices enable direct and remote user interaction with computer system 3110. The computer system enables significant post-process activity using at least one output device and/or the network interface subsystem.

The computer system can be structured as a server, a client, a workstation, a mainframe, a personal computer (PC), a tablet PC, a set-top box (STB), a personal digital assistant (PDA), a cellular telephone, a smartphone, a web appliance, a rack-mounted 'blade', a kiosk, a television, a game station, a network router, switch or bridge, or any data processing machine with instructions that specify actions to be taken by that machine. The term 'server', as used herein, refers to a computer or processor that typically performs processes for, and sends data and information to, another computer or processor.

A computer system typically is structured, in part, with at least one operating system program, such as Microsoft's Windows, Sun Microsystems's Solaris, Apple Computer's MacOs and iOS, Google's Android, Linux and/or Unix. The computer system typically includes a Basic Input/Output System (BIOS) and processor firmware. The operating system, BIOS and firmware are used by the processor to structure and control any subsystems and interfaces connected to the processor. Typical processors that enable these operating systems include: the Pentium, Itanium and Xeon processors from Intel; the Opteron and Athlon processors from Advanced Micro Devices; the Graviton processor from Amazon; the POWER processor from IBM; the SPARC processor from Oracle; and the ARM processor from ARM Holdings.

The claimed inventions and their embodiments are limited neither to an electronic digital logic computer structured with programs nor to an electronically programmable device. For example, the claimed inventions can use an optical computer, a quantum computer, an analog computer, or the like. Further, where only a single computer system or a single machine is signified, the use of a singular form of such terms also can signify any structure of computer systems or machines that individually or jointly use processes. Due to the ever-changing nature of computers and networks, the description of computer system 3110 depicted in FIG. 2A is intended only as an example. Many other structures of computer system 3110 have more or less components than the computer system depicted in FIG. 2A.

Network interface subsystem 3116 provides an interface to outside networks, including an interface to communication network 3118, and is coupled via communication network 3118 to corresponding interface devices in other computer systems or machines. Communication network 3118 can comprise many interconnected computer systems, machines and physical communication connections (signified by 'links'). These communication links can be wireline links, optical links, wireless links (e.g., using the WiFi or Bluetooth protocols), or any other physical devices for communication of information. Communication network 3118 can be any suitable computer network, for example a wide area network such as the Internet, and/or a local-to-wide area network such as Ethernet. The communication network is wired and/or wireless, and many communication networks use encryption and decryption processes, such as is available with a virtual private network. The communication network uses one or more communications interfaces, which receive data from, and transmit data to, other systems. Embodiments of communications interfaces typically include an Ethernet card, a modem (e.g., telephone, satellite, cable, or ISDN), (asynchronous) digital subscriber line (DSL) unit, Firewire interface, USB interface, and the like. Communication algorithms ('protocols') can be specified using one or communication languages, such as HTTP, TCP/IP, RTP/RTSP, IPX and/or UDP.

User interface input devices 3122 can include an alphanumeric keyboard, a keypad, pointing devices such as a mouse, trackball, toggle switch, touchpad, stylus, a graphics tablet, an optical scanner such as a bar code reader, touchscreen electronics for a display device, audio input devices such as voice recognition systems or microphones, eye-gaze recognition, brainwave pattern recognition, optical character recognition systems, and other types of input devices. Such devices are connected by wire or wirelessly to a computer system. Typically, the term 'input device' signifies all possible types of devices and processes to transfer data and information into computer system 3110 or onto communication network 3118. User interface input devices typically enable a user to select objects, icons, text and the like that appear on some types of user interface output devices, for example, a display subsystem.

User interface output devices 3120 can include a display subsystem, a printer, a fax machine, or a non-visual communication device such as audio and haptic devices. The display subsystem can include a cathode ray tube (CRT), a flat-panel device such as a liquid crystal display (LCD), an image projection device, or some other device for creating visible stimuli such as a virtual reality system. The display subsystem also can provide non-visual stimuli such as via audio output, aroma generation, or tactile/haptic output (e.g., vibrations and forces) devices. Typically, the term 'output device' signifies all possible types of devices and processes to transfer data and information out of computer system 3110 to the user or to another machine or computer system. Such devices are connected by wire or wirelessly to a computer system. Note: some devices transfer data and information both into and out of the computer, for example, haptic devices that generate vibrations and forces on the hand of a user while also incorporating sensors to measure the location and movement of the hand. Technical applications of the sciences of ergonomics and semiotics are used to improve the efficiency of user interactions with any processes and computers disclosed herein, such as any interactions with regards to the design and manufacture of circuits, that use any of the above input or output devices.

Memory subsystem 3126 typically includes a number of memories including a main random-access memory ('RAM') 3130 (or other volatile storage device) for storage of instructions and data during program execution and a read only memory ('ROM') 3132 in which fixed instructions are stored. File storage subsystem 3128 provides persistent storage for program and data files, and can include a hard disk drive, a floppy disk drive along with associated removable media, a CD-ROM drive, an optical drive, a flash memory such as a USB drive, or removable media cartridges. If computer system 3110 includes an input device that performs optical character recognition, then text and symbols printed on paper can be used as a device for storage of program and data files. The databases and modules used by some embodiments can be stored by file storage subsystem 3128.

Bus subsystem 3112 provides a device for transmitting data and information between the various components and subsystems of computer system 3110. Although bus subsystem 3112 is depicted as a single bus, alternative embodiments of the bus subsystem can use multiple busses. For example, a main memory using RAM can communicate directly with file storage systems using Direct Memory Access ('DMA') systems.

Figure 2B:
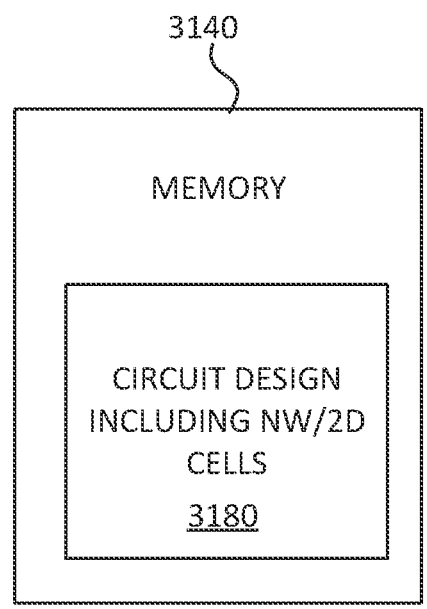

FIG. 2B depicts a memory 3140 such as a non-transitory, processor readable data and information storage medium associated with file storage subsystem 3128, and/or with network interface subsystem 3116, and can include a data structure specifying a circuit design. The memory 3140 can be a hard disk, a floppy disk, a CD-ROM, an optical medium, removable media cartridge, or any other medium that stores computer readable data in a volatile or non-volatile form, such as text and symbols on paper that can be processed by an optical character recognition system. A program transferred in to and out of a processor from such a memory can be transformed into a physical signal that is propagated through a medium (such as a network, connector, wire, or circuit trace as an electrical pulse); or through a medium such as space or an atmosphere as an acoustic signal, or as electromagnetic radiation with wavelengths in the electromagnetic spectrum longer than infrared light).

Figure 2C:
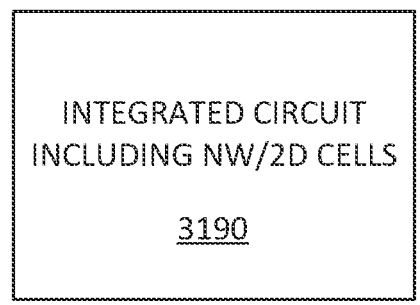

FIG. 2C signifies an article of manufacture, for example, an integrated circuit (element 3190) created by using one or more of the claimed inventions and their tangible forms that are specified by the Specification and Figures.

DETAILED DESCRIPTION—TECHNOLOGY SUPPORT EDA SYSTEM/WORKFLOW EXPLANATION

FIG. 1 depicts a set of processes 100 used during the design, verification and fabrication of an article of manufacture such as an integrated circuit to transform and verify design data and instructions that represent the integrated circuit. Each of these processes can be structured and enabled as multiple modules. The term 'EDA' signifies the term 'Electronic Design Automation'. These processes start with the creation of a product idea 110 with information supplied by a designer, information which is transformed to create an article of manufacture that uses a set of EDA processes 112. When the design is finalized, it is taped-out 134, which typically is when artwork (e.g., geometric patterns) for the integrated circuit is sent to a fabrication facility to manufacture the mask set, which is then used to manufacture the integrated circuit. After tape-out, a semiconductor die is manufactured 136 and packaging and assembly processes 138 are performed to produce the finished integrated circuit 140.

Specifications for a circuit or electronic structure are a res used in commerce at multiple levels of useful abstraction ranging from low-level transistor material layouts to high-level description languages. Most designers start with a description with less detail at a high-level of abstraction to design their circuits and systems, using a hardware description language ('HDL') such as VHDL, Verilog, SystemVerilog, SystemC, MyHDL or OpenVera. The high-level description is easier for designers to understand, especially for a vast system, and can describe very complex systems that are difficult to understand using a lower level of abstraction that is a more detailed description. The HDL description can be transformed into other levels of abstraction that are used by the developers. For example, a high-level description can be transformed to a logic-level register transfer level ('RTL') description, a gate-level description, a layout-level description, or a mask-level description. Each lower abstraction level that is a less abstract description adds more useful detail into the design description. The lower-levels of abstraction that are less abstract descriptions can be generated by a computer, derived from a design library, or created by another design automation process. An example of a specification language at a lower level of abstraction language for specifying more detailed descriptions is SPICE, which is much used for detailed descriptions of circuits with many analog components. A circuit specification for a circuit also has value as an article of manufacture in commerce as a good under the Uniform Commercial Code (see U.C.C. Article 2, Part 1).

A design process that uses EDA processes 112 includes processes 114 to 132, which are described below. This design flow description is used only to illustrate, not to limit. For example, a designer of an integrated circuit design can use the design processes in a different sequence than the sequence depicted in FIG. 1. For the embodiments disclosed herein, products from Synopsys, Inc. of Mountain View, Calif. (hereinafter signified by 'Synopsys'), are used to enable these processes, and/or similar products from other companies.

During system design 114, a designer specifies the functionality to be manufactured. The designer also can optimize the power, performance and area (physical and/or lines of code) and minimize costs, etc. Partitioning of the design into different types of modules can occur at this stage. Exemplary EDA products from Synopsys that enable system design 114 include: the Model Architect, Saber, System Studio, and Designware products.

During logic design and functional verification 116, modules in the circuit are specified in one or more description languages, and the specification is checked for functional accuracy, that is, that the modules produce outputs that match the requirements of the specification of the circuit or system being designed. Exemplary HDL languages are Verilog, VHDL and SystemC. Functional verification typically uses simulators and other programs such as testbench generators, static HDL checkers and formal verifiers. In some situations, special systems of modules referred to as 'emulators' or 'prototyping systems' are used to speed up the functional verification. Exemplary EDA products from Synopsys that can be used at this stage include: VCS, Vera, Designware, Magellan, Formality, ESP and Leda products. Exemplary emulator and prototyping products available from Synopsys that enable logic design and functional verification 30 include: Zebu® and Protolink® (® signifies 'Registered Trademark').

During synthesis and design for test 118, HDL code is transformed to a netlist (which typically is a graph structure where the edges represent components of a circuit and where the nodes represent how the components are interconnected). Both the HDL code and the netlist are hierarchical articles of manufacture that can be used by an EDA product to verify that the integrated circuit, when manufactured, performs according to its design. This netlist can be optimized for a target semiconductor manufacturing technology. Additionally, the finished integrated circuit is tested to verify that it satisfies the requirements of the specification. Exemplary EDA products from Synopsys that enable synthesis and design for test 118 include: the Design Compiler, Physical Compiler, Test Compiler, Power Compiler, FPGA Compiler, Tetramax, and Designware products.

During netlist verification 120, the netlist is checked for compliance with timing constraints and for correspondence with the HDL code. Exemplary EDA products from Synopsys that enable netlist verification 120 include: the Formality, Primetime, and VCS products.

During design planning 122, an overall floor plan for the integrated circuit is constructed and analyzed for timing and top-level routing. Exemplary EDA products from Synopsys that enable design planning 122 include: the Astro and IC Compiler products.

During layout implementation 124, physical placement (positioning of circuit components such as transistors or capacitors) and routing (connection of the components by multiple conductors) occurs, and the selection of cells from a library to enable specific logic functions. As used herein, the term 'cell' signifies a set of transistors, other components, and interconnections that provides a Boolean logic function (e.g., AND, OR, NOT, XOR) or a storage function (such as a flipflop or latch). As used herein, a circuit 'block' comprises two or more cells. Both a cell and a circuit block can be referred to as a module, and are enabled as both physical structures and in simulations. Parameters are specified for selected cells (based on 'standard cells') such as size, and made accessible in a database for use by EDA products. Examples of databases that can be used for accessing cells include MySQL and PostgreSQL. Exemplary EDA products from Synopsys that enable layout implementation 124 include: the Astro and IC Compiler products.

During analysis and extraction 126, the circuit function is verified at the layout level, which permits refinement of the layout design. Exemplary EDA products from Synopsys that enable analysis and extraction 126 include: the Astrorail, Primerail, Primetime, and Star RC/XT products.

During physical verification 128, the layout design is checked to ensure that manufacturing constraints are correct, such as DRC constraints, electrical constraints, lithographic constraints, and that circuitry function matches the HDL design specification. Exemplary EDA products from Synopsys that enable physical verification 128 include: the Hercules product.

During resolution enhancement 30, the geometry of the layout is transformed to improve how the design is manufactured. Exemplary EDA products from Synopsys that enable resolution enhancement 130 include: the *Proteus* product.

During tape-out, data is created to be used (after lithographic enhancements are applied if appropriate) for production of lithography masks. Example EDA products from Synopsys that enable tape-out include: the IC Compiler and Custom Designer products.

During mask-data preparation 132, the 'tape-out' data is used to produce lithography masks that are used to produce finished integrated circuits. Exemplary EDA products from Synopsys that enable mask-data preparation 132 include: the CATS family of products.

For all of the abovementioned EDA products, similar products from other EDA vendors, such as Cadence, Siemens, other corporate entities or various non-commercial products from universities, or open source repositories, can be used as an alternative.

A storage subsystem of a computer system (such as computer system 3110 of FIG. 2A, or computer system 300 of FIG. 3) is preferably used to store the programs and data structures that are used by some or all of the EDA products described herein, and products used for development of cells for the library and for physical and logical design that use the library.

DETAILED DESCRIPTION—TECHNOLOGY SUPPORT EMULATION ENVIRONMENT EXPLANATION

Figure 3:
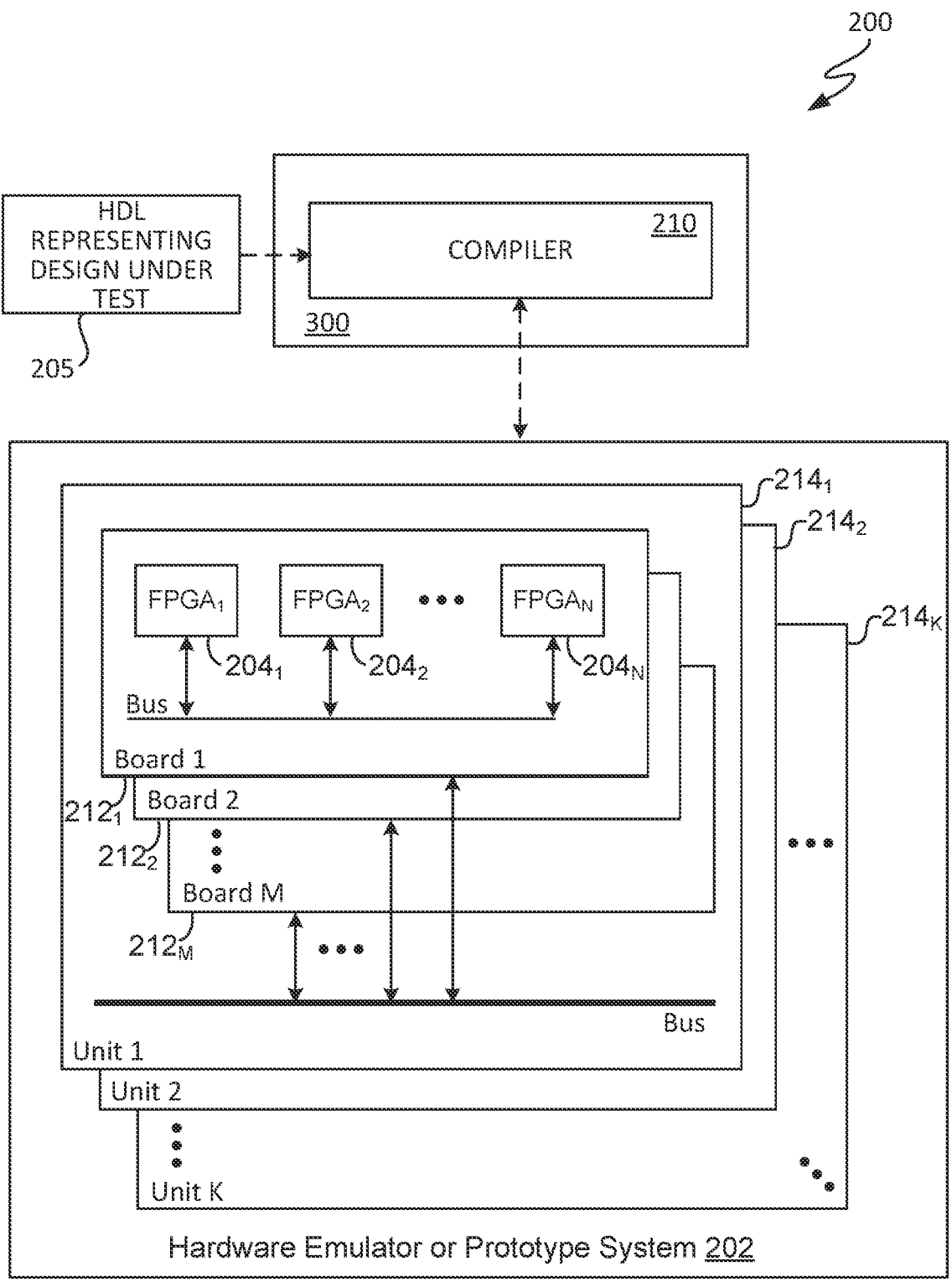
FIG. 3 depicts an abstract diagram of an emulation system.

An EDA system, such as the modules comprising element 112 depicted in FIG. 1, typically includes an emulation system 116 that a circuit designer uses to verify the functionality of the circuit design. FIG. 3 depicts an abstract diagram of such a system, which includes a host system 300 (typically a computer that is often part of an EDA system) and an emulation system 202 (typically a set of programmable devices such as Field Programmable Gate Arrays (FPGAs) or processors). The host system generates data and information, typically using a compiler 210, to structure the emulation system to emulate a circuit design. A circuit design to be emulated is also referred to as a Design Under Test ('DUT'), with data and information from the emulation used to verify the functionality of the DUT. One example of an emulation system to enable the embodiments disclosed herein is the Zebu product available from Synopsys.

The host system 300 comprises one or more processors. In the embodiment where the host system is comprised of multiple processors, the functions described herein as being performed by the host system can be distributed among the multiple processors.

The host system 300 typically includes a compiler 210 that transforms specifications written in a description language that represents a DUT, producing data (typically binary) and information that is used to structure the emulation system 202 to emulate the DUT. The compiler 210 can transform, change, restructure, add new functions to, and/or control the timing of the DUT.

The host system and emulation system exchange data and information using signals carried by an emulation connection. The connection can be one or more electrical cables, for example, cables with pin structures compatible with the RS232 or USB protocols. The connection can be a wired communication medium or network, such as a local area network, or a wide area network such as the Internet. The connection can be a wireless communication medium or a network with one or more points of access, using a wireless protocol such as Bluetooth® or IEEE 802.11. The host system and emulator can exchange data and information through a third device, such as a network server.

The emulation system includes multiple FPGAs (or other modules), for example, FPGAs $204_1$ to $204_N$ in FIG. 3. Each FPGA can include one or more FPGA interfaces through which the FPGA is connected to other FPGAs (and potentially other emulation components), in order for the FPGAs to exchange signals. An FPGA interface also can be referred to as an input/output pin or an FPGA pad. While some emulators only comprise FPGAs, other emulators can comprise other types of logic blocks instead of or along with, the FPGAs for emulating DUTs, for example, also comprising custom FPGAs, specialized ASICs for emulation or prototyping, memories, and input/output devices.

A programmable device can include an array of programmable logic blocks and a hierarchy of interconnections that can enable the programmable logic blocks to be interconnected according to the descriptions in the HDL code. Each of the programmable logic blocks can enable complex combinational functions, or enable simple logic gates, such as AND, and XOR logic blocks.

In many FPGAs, logic blocks also can include memory elements/devices, which can be simple latches, flip-flops or more complex blocks of memory. Depending on the length of the interconnections between different logic blocks, signals can arrive at input terminals of the logic blocks at different times (and thus need to be temporarily stored in the memory elements/devices).

FPGAs $204_1$-$204_N$ can be placed onto one or more boards $212_1$ through $212_M$. Multiple boards can be placed into an emulation unit, e.g. $214_1$. The boards within a unit can be connected using the backplane of the unit or any other types of connections. In addition, multiple units (e.g., $214_1$ through $214_K$) can be connected to each other by cables or any other means to form a multi-unit system. In general, a skilled person can structure the emulation or prototype system 202 as a single board, a single unit with multiple boards, or with multiple units.

For a DUT that is to be emulated, the host system transmits to the emulation system one or more bit files including a description of the DUT. The bit files further specify partitions of the DUT created by the host system with trace and injection logic, mappings of the partitions to the FPGAs of the emulator, and design constraints. Using the bit files, the emulator structures the FPGAs to perform the functions of the DUT. With some emulators, one or more FPGAs already have the trace and injection logic built into the silicon of the FPGA. For this type of emulation, the FPGAs do not have to be structured by the host system to emulate trace and injection logic.

The host system 110 receives (e.g., from a circuit designer, or from a storage subsystem) a description of a DUT that is to be emulated. In one embodiment, the DUT description is in a description language, such as a register transfer language (RTL). In another embodiment, the DUT description is in netlist level files, or a mix of netlist level files and HDL files. If part of the DUT description or the entire DUT description is in a HDL, the host system synthesizes the DUT description to create a gate level netlist using the DUT description. A host system can use the netlist of the DUT to partition the DUT into multiple partitions, with some of these partitions including trace and injection logic. The trace and injection logic traces interface signals exchanged via the interfaces of an FPGA. Additionally, the trace and injection logic can inject traced interface signals into the logic of the FPGA. The host system maps each partition to an FPGA of the emulator. With some emulators, the trace and injection logic is only included in select partitions for a group of FPGAs. The trace and injection logic can be built into one or more of the FPGAs of an emulator. The host system can synthesize multiplexers to be mapped into the FPGAs. The multiplexers can be used by the trace and injection logic to inject interface signals into the DUT logic.

The host system creates bit files describing each partition of the DUT and the mapping of the partitions to the FPGAs. For partitions in which trace and injection logic are included, the bit files also describe the logic that is included. The bit files also can include place and route information and design constraints. The host system stores the bit files and also stores for components of the DUT information describing which FPGAs are to emulate each component of the DUT (to which FPGAs each component is mapped).

Upon request, the host system transmits the bit files to the emulator. The host system signals the emulator to start the emulation of the DUT. During emulation of the DUT or at the end of the emulation, the host system receives emulation results from the emulator through the emulation connection. Emulation results are data and information generated by the emulator during the emulation of the DUT, which include interface signals (states of interface signals) traced by the trace and injection logic of each FPGA. The host system can store the emulation results, and/or transmits them to another processing system.

After emulation of the DUT, a circuit designer can request to debug a component of the DUT. If such a request is made, the circuit designer can provide a time period of the emulation to debug. The host system identifies which FPGAs are emulating the component using the stored information. The host system retrieves stored interface signals associated with the time period and traced by the trace and injection logic of each identified FPGA. The host system signals the emulator to re-emulate the identified FPGAs, either one by one, multiple at a time, or altogether. The host system transmits the retrieved interface signals to the emulator in order to re-emulate the component for the time period. The trace and injection logic of each identified FPGA injects its respective interface signals received from the host system into the logic of the DUT mapped to the FPGA. In case of multiple re-emulations of an FPGA, merging the results produces a full debug view.

The host system receives, from the emulation system, signals traced by logic of the identified FPGAs during the re-emulation of the component. The host system stores the signals received from the emulator. The signals traced during the re-emulation can have a higher sampling rate than during the initial emulation. For example, in the initial run a traced signal can comprise a saved state of the component every X milliseconds. However, in the re-emulation the traced signal can comprise a saved state every Y milliseconds, where Y is less than X. If the circuit designer requests to view a waveform of a signal traced during the re-emulation, the host system can retrieve the stored signal and display a plot of the signal (generates a waveform of the signal). Afterwards the designer can, for example, request to re-emulate the same component but for a different time period or to re-emulate another component.

A host system typically comprises at least seven sub-systems: a design synthesizer, a mapping sub-system, a run time sub-system, a results sub-system, a debug sub-system, a waveform sub-system, and a storage sub-system. Each of these sub-systems can be structured and enabled as multiple modules. Together these sub-systems structure the emulator, and monitor the emulation results.

The design synthesizer transforms the HDL of a DUT into gate level logic. For a DUT that is to be emulated, the design synthesizer receives a description of the DUT. If the description of the DUT is fully or partially in HDL (e.g., RTL or other level of abstraction), the design synthesizer 210 synthesizes the HDL of the DUT to create a gate-level netlist with a description of the DUT in terms of gate level logic.

The mapping sub-system partitions DUTs and maps partitions into emulator FPGAs. The mapping sub-system partitions a DUT at the gate level into a number of partitions using the netlist of the DUT. For each partition, the mapping sub-system retrieves a gate level description of the trace and injection logic and adds the logic to the partition. As described above, the trace and injection logic included in a partition is used to trace signals exchanged via the interfaces of an FPGA to which the partition is mapped (trace interface signals). The trace and injection logic can be added to the DUT prior to the partitioning. For example, the trace and injection logic can be added by the design synthesizer prior to or after the synthesizing the HDL of the DUT.

In addition to including the trace and injection logic, the mapping sub-system can include additional tracing logic in a partition in order to trace the states of certain DUT components that are not traced by the trace and injection logic (to trace signals other than the interface signals traced by the trace and injection logic). The mapping sub-system can include the additional tracing logic in the DUT prior to the partitioning or in partitions after the partitioning. The design synthesizer can include the additional tracing logic in an HDL description of the DUT prior to synthesizing the description.

The mapping sub-system maps each partition of the DUT to an FPGA of the emulator. For partitioning and mapping, the mapping sub-system uses design rules, design constraints (e.g., timing or logic constraints), and information about the emulator. For components of the DUT, the mapping sub-system stores information in the storage sub-system describing which FPGAs are to emulate each component.

Using the partitioning and the mapping, the mapping sub-system generates one or more bit files that describe the created partitions and the mapping of logic to each FPGA of the emulator. The bit files can include additional information, such as constraints of the DUT, and routing information of connections between FPGAs and connections within each FPGA. The mapping sub-system can generate a bit file for each partition of the DUT, which can be stored in the storage sub-system. Upon request from a circuit designer, the mapping sub-system transmits the bit files to the emulator, which the emulator uses to structure the FPGAs to emulate the DUT.

If the emulator includes specialized ASICs that include the trace and injection logic, the mapping sub-system can generate a specific structure that connects them to the DUT, or just save the information of what traced/injected signal is and where the information is stored on the specialized ASIC.

The run time sub-system controls emulations performed by the emulator. The run time sub-system can cause the emulator to start or stop executing an emulation. Additionally, the run time sub-system can provide input signals/data to the emulator. The input signals can be provided directly to the emulator through the connection or indirectly through other input signal devices. For example, the host system with the run time sub-system can control an input signal device to provide the input signals to the emulator. The input signal device can be, for example, a test board (directly or through cables), signal generator, another emulator, or another host system.

The results sub-system processes emulation results generated by the emulator. During emulation and/or after completing the emulation, the results sub-system receives emulation results from the emulator generated during the emulation. The emulation results include signals traced during the emulation. Specifically, the emulation results include interface signals traced by the trace and injection logic emulated by each FPGA, and can include signals traced by additional logic included in the DUT. Each traced signal can span multiple cycles of the emulation. A traced signal is comprised of multiple states and each state is associated with a time of the emulation. The results sub-system stores the traced signals received in the storage sub-system. For each stored signal, the results sub-system can store information indicating which FPGA generated the traced signal.

The debug sub-system allows circuit designers to debug DUT components. After the emulator has emulated a DUT and the results sub-system has received the interface signals traced by the trace and injection logic during the emulation, a designer can request to debug a component of the DUT by re-emulating the component for a specific time period. In a request to debug a component, the designer identifies the component and indicates a time period of the emulation to debug. The designer's request also can include a sampling rate that indicates how often states of debugged components should be saved by logic that traces signals.

The debug sub-system identifies the one or more FPGAs of the emulator that are emulating the component using the information stored by the mapping sub-system in the storage sub-system. For each identified FPGA, the debug sub-system retrieves, from the storage sub-system, interface signals traced by the trace and injection logic of the FPGA during the time period indicated by the designer (i.e., retrieve states traced by the trace and injection logic that are associated with the time period).

The debug sub-system transmits the retrieved interface signals to the emulator. The debug sub-system instructs the debug sub-system to use the identified FPGAs and for the trace and injection logic of each identified FPGA to inject its respective traced signals into logic of the FPGA in order to re-emulate the component for the requested time period. The debug sub-system also can transmit the sampling rate provided by the designer to the emulator so that the tracing logic traces states at the proper intervals.

To debug the component, the emulator only has to use the FPGAs to which the component has been mapped. Additionally, the re-emulation of the component does not have to start from the beginning, but can start at any point desired by the designer.

For an identified FPGA, the debug sub-system can transmit instructions to the emulator to load multiple emulator FPGAs with the same configuration of the identified FPGA. The debug sub-system additionally signals the emulator to use the multiple FPGAs in parallel. Each FPGA from the multiple FPGAs is used with a different time window of the interface signals in order to generate a larger time window in a shorter amount of time. For example, the identified FPGA can require an hour or more to use a certain amount of cycles. However, if multiple FPGAs have the same data and structure of the identified FPGA and each of these FPGAs runs a subset of the cycles, it can only require a few minutes for the FPGAs to collectively use all of the cycles.

A circuit designer can identify a hierarchy or a list of DUT signals to re-emulate. To enable this, the debug sub-system determines the FPGA needed to emulate the hierarchy or list of signals, retrieves the necessary interface signals and transmits the retrieved interface signals to the emulator for re-emulation. Hence, a designer can identify any element (e.g., component/device or signal) of the DUT to debug/re-emulate.

The waveform sub-system generates waveforms using the traced signals. If a circuit designer requests to view a waveform of a signal traced during an emulation run, the host system retrieves the signal from the storage sub-system. The waveform sub-system displays a plot of the signal. For one or more signals, when the signals are received from the emulator, the waveform sub-system can automatically generate the plots of the signals.

DETAILED DESCRIPTION—SEMANTIC SUPPORT

The signifier 'commercial solution' signifies, solely for the following paragraph, an engineering domain-specific (and thus non preemptive—see Bilski): electronic structure, a process for a specified machine, a manufacturable circuit (and their Church-Turing equivalents) or a composition of matter that applies science and/or technology in commerce to solve a technical problem.

The signifier 'abstract' (when used in a patent claim for any enabled embodiments disclosed herein for a new commercial solution that is a scientific use of one or more laws of nature [see Benson], and that solves a problem of technology [see Diehr] used in commerce—or improves upon an existing commercial solution [see Diehr])—is precisely defined by the inventor(s) [see MPEP 2111.01 (9$^{th}$ edition, Rev. 08.2017)] as follows:

a) a new commercial solution is 'abstract' if it is not novel (e.g., it is so well known in equal prior art [see Alice] and/or the use of equivalent prior art solutions is long prevalent [see Bilski] in science, engineering or commerce), and thus unpatentable under 35 U.S.C. 102, for example, because it is 'difficult to understand' [see Merriam-Webster definition for 'abstract'] how the commercial solution differs from equivalent prior art solutions; or b) a new commercial solution is 'abstract' if it is obvious, that is, if the existing prior art includes at least one analogous prior art solution [see KSR], or the existing prior art includes at least two prior art publications that can be combined [see Alice] by a skilled person [often referred to as a 'PHOSITA', see MPEP 2141-2144 (9$^{th}$ edition, Rev. 08.2017)] to be equivalent to the new commercial solution, and is thus unpatentable under 35 U.S.C. 103, for example, because it is 'difficult to understand' how the new commercial solution differs from a PHOSITA-combination/-application of the existing prior art; or c) a new commercial solution is 'abstract' if it is not disclosed with a description that enables its praxis, either because insufficient guidance exists in the description, or because only a generic implementation is described [see Mayo] with unspecified components, parameters or functionality, so that a PHOSITA is unable to instantiate an embodiment of the new solution for use in commerce, without, for example, requiring special programming [see Katz] (or, e.g., circuit design) to be performed by the PHOSITA, and is thus unpatentable under 35 U.S.C. 112, for example, because it is 'difficult to understand' how to use in commerce any embodiment of the new commercial solution.

DETAILED DESCRIPTION—DEFINITIONS

As used herein, the semiotic function RUD(t,p1,p2, . . . ) signifies that a skilled person can obtain, if needed for progressing the useful arts, a reasonably useful definition of the signifier 't' that comprises the union of definitions of 't' in one or more U.S. Patents and U.S. Patent Applications 'p1', 'p2', etc. For example, 'RUD(substantially, 9532624)' signifies that a skilled person can obtain a reasonably useful definition of 'substantially' as it is defined in U.S. Pat. No. 9,532,624.

DEFINITIONS: RUD(substantially, 9532624).

DETAILED DESCRIPTION—CONCLUSION

The Detailed Description signifies in isolation the individual features, structures, functions, or characteristics described herein and any combination of two or more such features, structures, functions or characteristics, to the extent that such features, structures, functions or characteristics or combinations thereof are enabled by the Detailed Description as a whole in light of the knowledge and understanding of a skilled person, irrespective of whether such features, structures, functions or characteristics, or combinations thereof solve any problems disclosed herein, and without limitation to the scope of the Claims of the patent. When an embodiment of a claimed invention comprises a particular feature, structure, function or characteristic, it is within the knowledge and understanding of a skilled person to use such feature, structure, function, or characteristic in connection with other embodiments whether or not explicitly described, for example, as a substitute for another feature, structure, function or characteristic.

In view of the Detailed Description, a skilled person will understand that many variations of the claimed inventions can be enabled, such as function and structure of elements, described herein while remaining in the domain of the claimed inventions. One or more elements of an embodiment can be substituted for one or more elements in another embodiment, as will be understood by a skilled person. Writings about embodiments signify their uses in commerce, thereby enabling other skilled people to similarly use in commerce.

This Detailed Description is fitly written to provide knowledge and understanding. It is neither exhaustive nor limiting of the precise structures described, but is to be accorded the widest scope consistent with the disclosed principles and features. A skilled person can enable many equivalent variations. Without limitation, any and all equivalents described, signified or Incorporated By Reference in this patent application are specifically Incorporated By Reference into the Detailed Description. In addition, any and all variations described, signified or Incorporated By Reference with respect to any one claimed invention and its embodiment also are included with all other claimed inventions and their embodiments. Any such variations include both currently known variations as well as future variations, for example any element used for enablement includes a future equivalent element that provides the same function, regardless of the structure of the future equivalent element.

It is intended that the domain of the set of claimed inventions and their embodiments be defined and judged by the following Claims and their equivalents. The Detailed Description includes the following Claims, with each Claim standing on its own as a separate claimed invention. The embodiments of the claimed inventions can have more structure and features than are explicitly specified in the Claims.

What is claimed:

1. A computer system configured to perform signature verification, the computer system comprising:

a memory storing instructions; and a processor, coupled with the memory to execute the instructions, the instructions when executed by the processor causing the processor to:

substitute a double scalar multiplication for two single scalar multiplications;

perform the substituted multiplication to verify the signature, wherein said double scalar multiplication is used for signature verification in an encryption/decryption system, said double scalar multiplication being defined by a first integer applied to a first point on an elliptic curve and a second integer applied to a second point on the elliptic curve; and verify a group equation defined by $[S]B=R+[k]A'$ of the encryption/decryption system, wherein S is an integer characterized by the signature, K is an integer generated by a message being encrypted, B is a base point on the elliptic curve, R is a point on the elliptic curve and characterized by the signature, and A' is a public key.

2. The computer system of claim 1 wherein the computer system is further configured to rearrange the group equation to one of $[S]B-[k]A'=R$ or $[S]B+[-k]A'=R$.

3. The computer system of claim 2 wherein the computer system is further configured to convert the $-k$ in the group equation $[S]B+[-k]A'=R$ to $[S]B+[n-k]A'=R$, where n is the order of the base point.

4. The computer system of claim 3 wherein the computer system is further configured to determine points $B+A'$ and $B-A'$.

5. The computer system of claim 4 wherein the computer system is further configured to determine a joint sparse form for the integers S and n−k.

6. The computer system of claim 5 wherein the computer system is further configured to apply the Shamir's algorithm to the joint sparse form to verify the group equation $[S]B+[n-k]A'=R$.

7. The computer system of claim 2 wherein the computer system is further configured to convert the group equation $[S]B+[-k]A'=R$ to $[S]B+[k](-A')=R$.

8. The computer system of claim 7 wherein the computer system is further configured to determine a joint sparse form for the integers S and k.

9. The computer system of claim 8 the computer system is further configured to apply the Shamir's algorithm to the joint sparse form to verify the group equation $[S]B+[-k]A'=R$.

10. The computer system of claim 6 wherein said computer system is a distributed computer system.

11. A method for signature verification, the method comprising:

substituting a double scalar multiplication for two single scalar multiplications;

performing, by a processor, the substituted multiplication to verify the signature, wherein said double scalar multiplication is used for signature verification in an encryption/decryption system, said double scalar multiplication being defined by a first integer applied to a first point on an elliptic curve and a second integer applied to a second point on the elliptic curve; and verifying a group equation defined by $[S]B=R+[k]A'$ of the encryption/decryption system, wherein S is an integer characterized by the signature, K is an integer generated by a message being encrypted, B is a base point on the elliptic curve, R is a point on the elliptic curve and characterized by the signature, and A' is a public key.

12. The method of claim 11 further comprising rearranging the group equation to one of $[S]B-[k]A'=R$ or to $[S]B+[-k]A'=R$.

13. The method of claim 12 further comprising converting the $-k$ in the group equation $[S]B+[-k]A'=R$ to $[S]B+[n-k]A'=R$, where n is the order of the base point.

14. The method of claim 13 further comprising determining points $B+A'$ and $B-A'$.

15. The method of claim 14 further comprising determining a joint sparse form for the integers S and n−k.

16. The method of claim 15 further comprising applying the Shamir's algorithm to the joint sparse form to verify the group equation $[S]B+[n-k]A'=R$.

17. The method of claim 12 further comprising converting the group equation $[S]B+[-k]A'=R$ to $[S]B+[k](-A')=R$.

18. The method of claim 12 further comprising determining a joint sparse form for the integers S and k.

19. The method of claim 18 further comprising applying the Shamir's algorithm to the joint sparse form to verify the group equation $[S]B+[-k]A'=R$.

20. The method of claim 11 wherein said processor is a distributed processor.

* * * * *